(12) United States Patent
Yang

(10) Patent No.: US 6,807,434 B1
(45) Date of Patent: *Oct. 19, 2004

(54) COMMUNICATION SYSTEM FOR TELEPHONE

(75) Inventor: Bill Yang, Taipei (TW)

(73) Assignee: Contron Corporation, Taipei (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 604 days.

(21) Appl. No.: 09/264,769

(22) Filed: Mar. 9, 1999

(30) Foreign Application Priority Data

Feb. 1, 1999 (TW) .................................... 88201633 U (51) Int. Cl.[7] .............................. H04B 1/38; H04M 1/00
(52) U.S. Cl. ................. 455/569.1; 455/99; 455/575.2; 455/575.9; 379/430; 379/431
(58) Field of Search .............................. 455/569.2, 95, 455/568, 575.9, 151.2, 99, 100, 66, 41.2, 74, 11.1, 90, 569.1, 575.2; 379/430, 431

(56) References Cited

U.S. PATENT DOCUMENTS

| | | | | |
|---|---|---|---|---|
| 5,301,353 A | * | 4/1994 | Borras et al. .................... 455/9 |
| 5,552,708 A | * | 9/1996 | Ham .......................... 455/568 |
| 5,553,312 A | * | 9/1996 | Gattey et al. ............... 455/11.1 |
| 5,590,417 A | * | 12/1996 | Rydbeck ....................... 455/90 |
| 5,613,222 A | * | 3/1997 | Guenther ..................... 455/569 |
| 5,749,057 A | * | 5/1998 | Takagi ......................... 455/569 |
| 5,771,438 A | * | 6/1998 | Palermo et al. ............... 455/41 |
| 5,802,167 A | * | 9/1998 | Hong .......................... 455/569 |
| 5,805,672 A | * | 9/1998 | Barkat et al. ................ 455/569 |
| 5,826,187 A | * | 10/1998 | Core et al. ................... 455/412 |
| 5,913,163 A | * | 6/1999 | Johansson ................... 455/426 |
| 5,943,627 A | * | 8/1999 | Kim et al. ................... 455/569 |
| 5,974,332 A | * | 10/1999 | Chung ......................... 455/569 |
| 6,016,432 A | * | 1/2000 | Stein ........................... 455/90 |

* cited by examiner

*Primary Examiner*—Simon Nguyen
(74) *Attorney, Agent, or Firm*—J.C. Patents (57) ABSTRACT

A communication system for telephone. The system uses infrared or radio wave as a medium for transmitting voice signal from a telephone to a receiver earphone worn by the user, and then uses a microphone to pick up voice messages from the user. Hence, hands-free telephone conversation is possible.

39 Claims, 5 Drawing Sheets

COMMUNICATION SYSTEM FOR TELEPHONE

CROSS-REFERENCE TO RELATED APPLICATION

This application claims the priority benefit of Taiwan application serial no. 88201633, filed Feb. 1, 1999, the full disclosure of which is incorporated herein by reference.

BACKGROUND OF THE INVENTION

1. Field of Invention

The present invention relates to a communication system for telephone. More particularly, the present invention relates to a communication system using infrared or radio wave as a medium for transmitting voice signal. The communication system also employs an earphone to transmit voice signal to the user's ear and a microphone to collect voice output from the user so that hands-free, telephone communication is possible.

2. Description of Related Art

In today's society, communication equipment is indispensable to our daily life. Through our telephone network, communication across great distances becomes possible and people around the world are pulled closer to each other than ever before. Nowadays, products for communication are developed at a fast pace. Besides being lightweight ad convenient to use, newer generations of communication products can be used almost anywhere from inside an office or a household to outdoor area such as the street or inside a car. Normally, wireless or cordless telephones are used within an office area or at home and mobile or cellular telephones are mainly used outdoors.

However, talking through a mobile or cellular telephone while driving a car is very dangerous. Statistics shows that many accidents occur when a driver is driving a car with one hand while holding a mobile or cellular telephone with the other. The reason is that talking over the telephone causes great distraction. Sufficient distractions may rob the driver's concentration on the wheel and the road so that roadside accidents increase. Therefore, many countries are in the process of enacting laws forbidding drivers to talk over a handheld telephone while driving. One solution is to use hands-free headset that contains an earphone and a microphone. However, using a headset with wires linking to a mobile or cellular telephone, for example, can still cause some problems. The wires from the headset may tangle with the steering wheel or the gear-shifting stick inside the car during driving. Hence, the earphone may be abruptly removed from the user's head, which leads to distractions that may affect road safety.

Similarly, a wireless telephone users also experiences the same type of inconveniences as a car driver when he or she is using a telephone in an office or at home. Because the users has to hold the handset with one hands, the user's hand may get tired after a period of use. In addition, if the user needs to use both hands to perform some other tasks, he or she may have to use his or her shoulder and neck to grip the handset. After using a wireless telephone in this fashion for some time, chronic neck pain may occur.

In fight of the foregoing, there is a need to provide a communication system for telephone conversation that is capable of eliminating the inconveniences and problems found in conventional systems.

SUMMARY OF THE INVENTION

Accordingly, the purpose of the present invention is to provide a communication system for telephone such that hands-free communication for wireless, wired, mobile or cellular telephone is possible.

To achieve these and other advantages and in accordance with the purpose of the invention, as embodied and broadly described herein, the invention provides an infrared communication system suitable for wireless, mobile or cellular telephones that are used inside cars or indoors. The telephone communication system includes a microphone, a transmitter and a receiver earphone. The microphone is connected via a piece of cable to a wireless, a wired, a mobile or a cellular telephone unit for receiving a first voice signal and then delivering it to the wired/wireless/mobile/cellular telephone unit. The transmitter is also connected to the wired/wireless/mobile/cellular telephone unit for receiving a second voice signal from the wired/wireless/mobile/cellular telephone unit and then converting the second voice signal into wireless signals. The receiver earphone comprises a receiver and an earphone. The receiver is used for receiving the wireless signals transmitted by the transmitter and then converting the signals into a third voice signal for the user to listen to.

The microphone of the aforementioned telephone communication system is connected by wiring to the mouthpiece circuit of the telephone. The microphone is in turn positions close to user's mouth so that sound emitted by the user can be easily received. The transmitter is electrically connected to the telephone speaker circuit. Hence, the transmitter is able to convert the voice signal coming from the telephone into wireless signals and then broadcast them away. Through the receiver/earphone system worn on user's head, the user is able to pick up voice from the telephone. The receiver can actually be fixed in whatever place user found to be convenient. For example, the receiver can be placed near user's pocket, somewhere around the neck, in front of the chest, in fact any location where wireless signals can be easily picked up. Furthermore, wireless signals include both infrared wave and radio wave. Because voice signals coming from the telephone unit is picked up by the user through an earphone, privacy of conversation can be maintained. In addition, through a transmitter-receiver earphone system, hands-free telephone communication is possible. Moreover, the only changes necessary for introducing the telephone communication system of this invention is to wire a microphone to the mouthpiece circuit and to install a unidirectional wireless transmitter onto the loudspeaker. Therefore, as soon as the user wears the receiver earphone, hand-free telephone conversation is immediately available at a small cost. The telephone communication system, besides being useful for car drivers having a mobile, cellular or car telephone, can be applied to indoor wired telephone as well.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference now be made in detail to the present preferred embodiments of the invention, examples of which are illustrated in the accompanying drawings. Wherever possible, the same reference numbers are used in the drawings and the description to refer to the same or like parts.

Figure 1A:
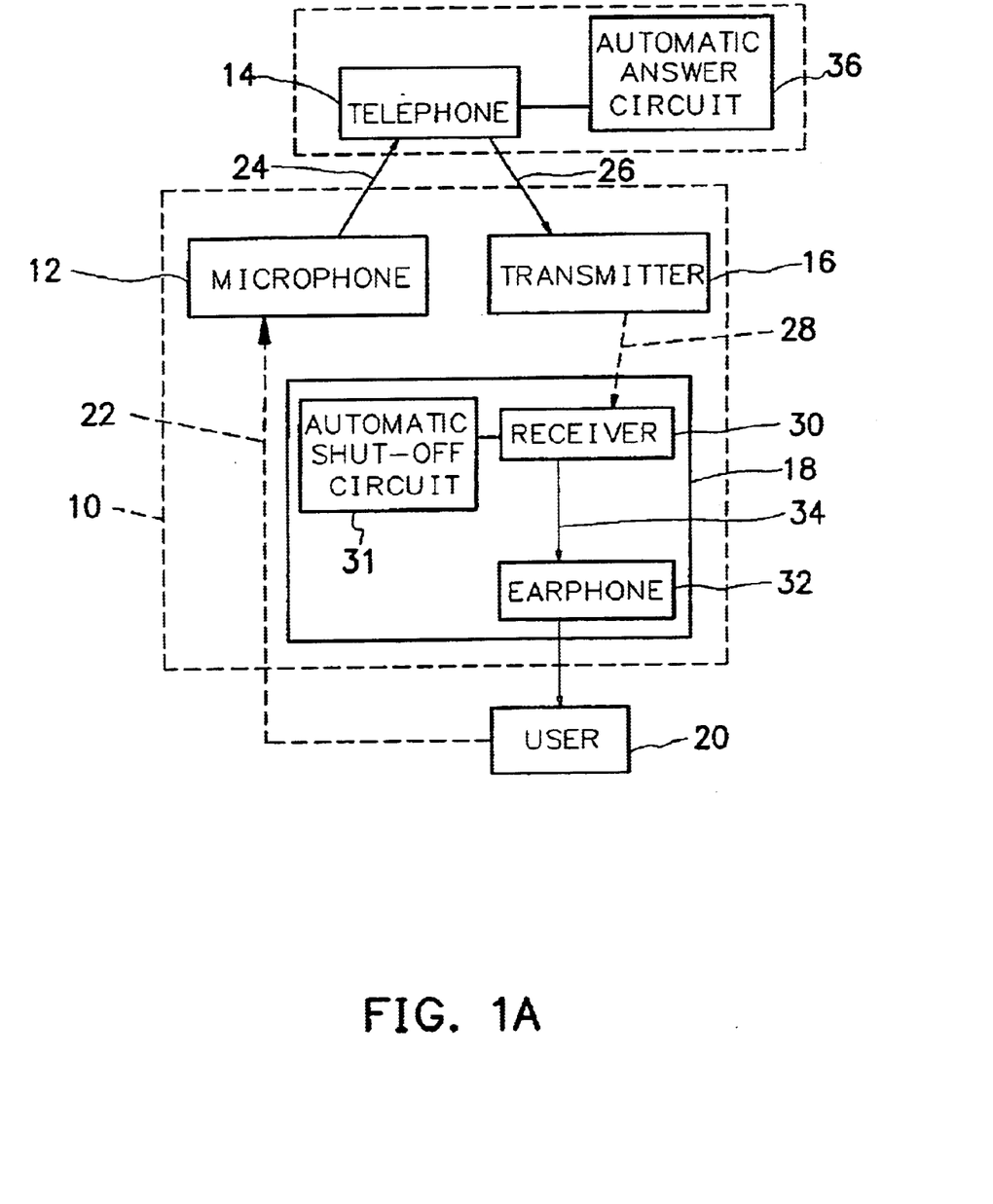
FIG. 1A is a block diagram showing a schematic layout of a telephone communication system according to one preferred embodiment of this invention.

FIG. 1A is a block diagram showing a schematic layout of the telephone communication system according to one preferred embodiment of this invention.

As shown in FIG. 1A, the telephone communication system 10 of this invention includes a microphone 12, a transmitter 16 and a receiver earphone 18. The microphone 12 and the transmitter 16 are connected to a telephone 14. The telephone 14 can be a mobile telephone, a cellular telephone, a car telephone, an indoor wired telephone or an indoor wireless telephone. The microphone 12 is used for receiving a first voice signal 22 from a user 20, and then the first voice signal 22 is passed on to the telephone 14 through a cable 24. Subsequently, the telephone 14 sends out the first voice signal 22 to a telephone network. The transmitter 16 is used for receiving incoming voice signal 26 (a second voice signal) from the telephone network via the telephone 14. After converting the second voice signal 26 into wireless signals 28 in the infrared or radio range, the transmitter 16 broadcasts the signals 28 out. The receiver earphone 18 includes receiver 30 and an earphone 32. The receiver 30 is responsible for receiving the wireless signals 28 from the transmitter 16, and then converting the wireless signal 28 into a voice signal 34 (a third voice signal). Finally, through the earphone 32, the user 20 is able to listen to the voice from the other party on the other side of the telephone network. Furthermore, the receiver 30 can include an automatic shut-off circuit 31. When the receiver 30 does not pick up any signal for a predetermined period, power to the receiver earphone 18 will automatically be cut so that power consumption is minimized. When this invention is applied, the user 20 usually wears the earphone 18. Therefore, the telephone 14 preferably includes an automatic answer circuit 36. When the telephone 14 rings for a pre-determined period, for example, three times or three seconds, the automatic answer circuit 36 will automatically pick up the call. Then, the user 20 can answer the caller through the telephone communication system 10.

Figure 1B:
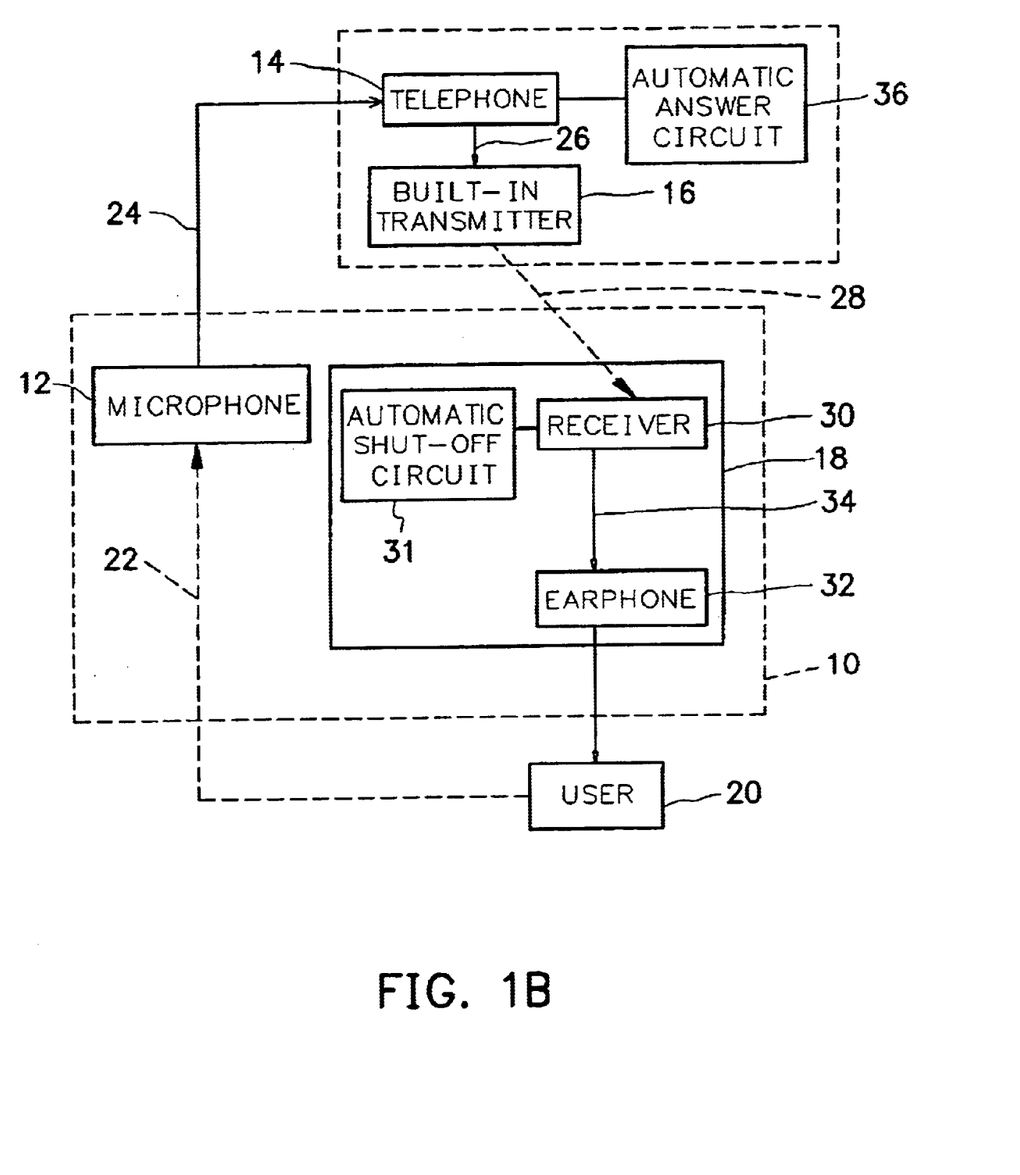
FIGS. 1B, 1C are block diagrams showing a schematic layout of a telephone communication system according to another preferred embodiment of this invention.

FIG. 1B is a block diagram showing a schematic layout of the telephone communication system according to another preferred embodiment of this invention. As shown in FIG. 1B, alternatively, the transmitter 16 also can be built in the telephone 14. Therefore, the transmitter 16 can be powered by the power supply of the telephone 14, for example, batteries.

Figure 1C:
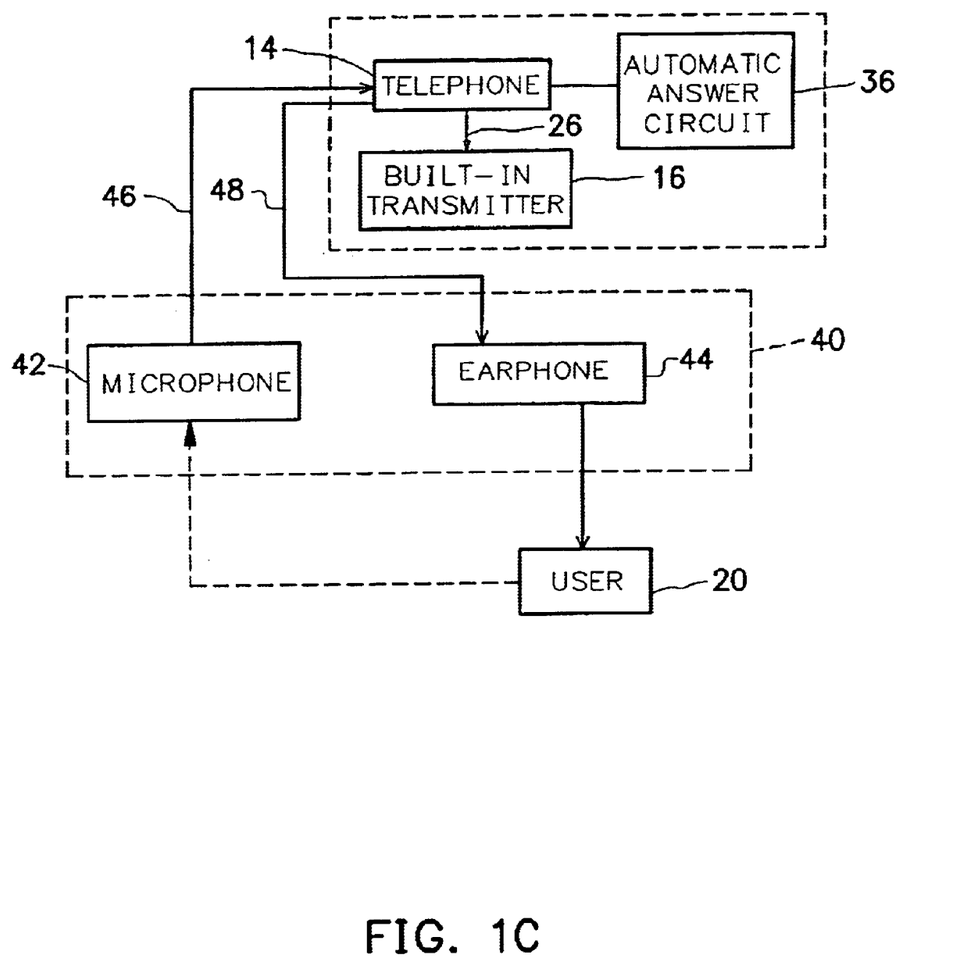

FIG. 1C is a block diagram showing a schematic layout of the telephone communication system according to another preferred embodiment of this invention. Referring to FIG. 1C, even the telephone 14 has a built-in transmitter 16, the telephone 14 is compatible with a conventional headset 40 for the telephone. A conventional headset 40 includes a microphone 42 and an earphone 44. When the conventional headset 40 is connected to the telephone 14 through wires 46, 48, the function of the built-in transmitter 16 is disabled. For example, a cellular telephone 14 with a built-in transmitter 16 has a connector which connects the telephone communication system and the telephone 14. Being Similar to a conventional earphone/microphone connector, the connector consists of a socket and a plug, which has three electrodes respectively: one for microphone, another for earphone and the other for ground. For the case in FIG. 1B, the microphone electrode and the ground electrode of the plug are respectively coupled to the microphone electrode and the ground electrode of the socket. Meanwhile, the earphone electrode is floating so that the built-in transmitter 16 is enabled. For the case in FIG. 1C, the three electrodes of the plug are respectively coupled to the electrodes of the socket. The connector will detect that the earphone 44 is engaged, and then disable the built-in transmitter 16.

Although radio frequency can serve as a medium for carrying out voice communication, infrared wave has several advantages over radio frequency especially for short distance transmission. Firstly, radio frequency equipment are generally more costly to build. Secondly, only one-channel, mono-infrared light rays are required in this invention. One-channel, mono-infrared light rays are even cheaper to produce than two-channel infrared light rays. Thirdly, a large number of household or office appliances are electronically operated using radio wave frequencies. Hence, transmitted telephone signals are likely to be interfered, thereby lowering telephone voice quality. Alternatively, the electronic appliances may malfunction due to interference from the telephone. In addition, many medical researchers have pointed out the potential danger of radio frequency emission to people's health. Therefore, infrared wave is less interfered with by surrounding noises and less hazardous to people's health compared with radio wave. However, it is by no means a restriction to the type of communication medium. In fact, anyone familiar with electronic communication can still set up the same telephone communication system using radio frequency as well.

Figure 2:
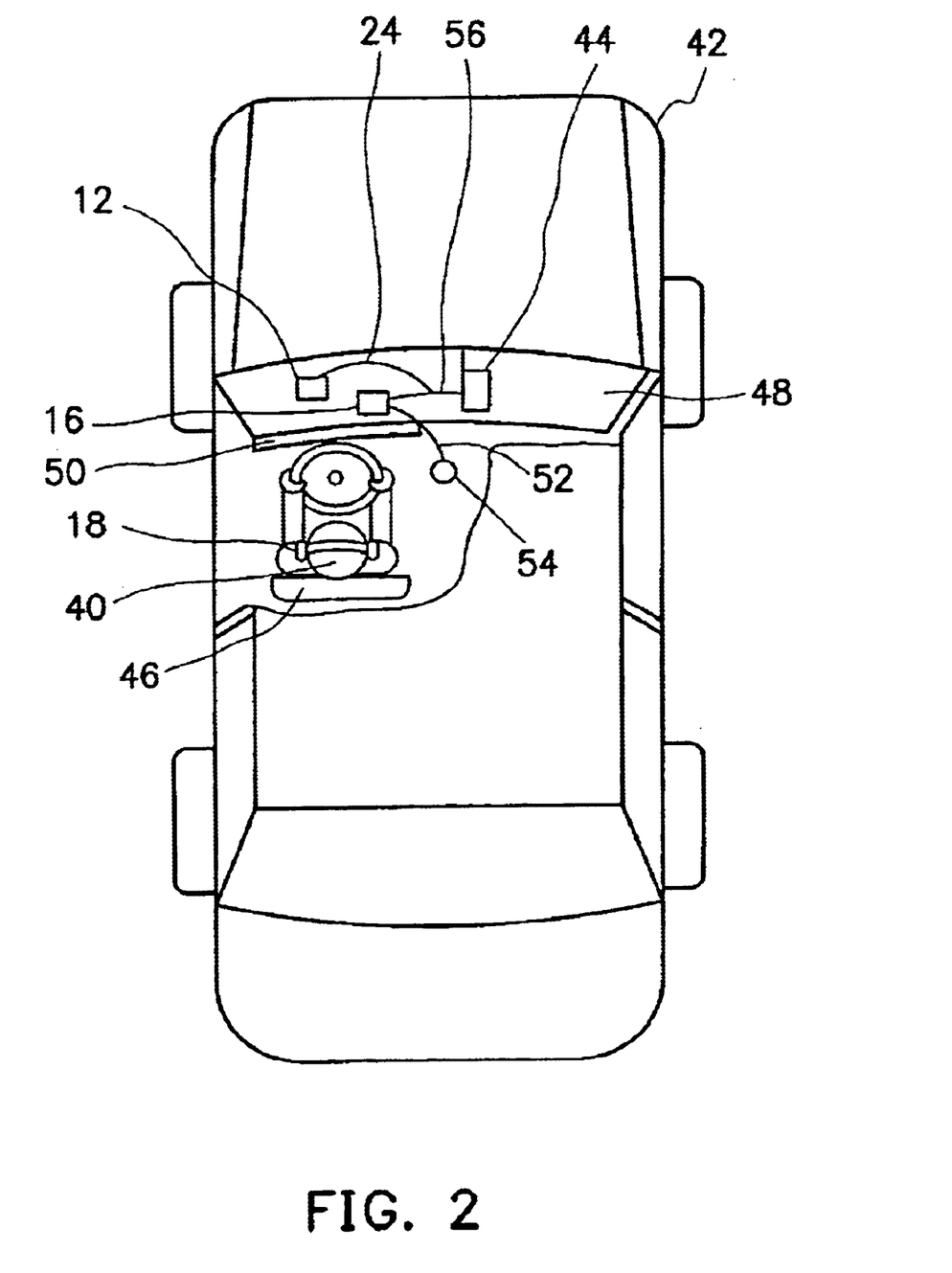
FIG. 2 is a diagram showing the components of a telephone communication system set up inside a car according to this invention.

An example is given below to illustrate how the telephone communication system can be applied in practice. FIG. 2 is a diagram showing the components of a telephone communication system set up inside a car according to this invention. In FIG. 2, a car driver 40 is seated inside a car 42. In general, a mobile or cellular telephone 44 (or car telephone) is usually placed on the dashboard 48 in front of the driver's seat 46 or to either side of the driver's seat 46. Some types of car may even have a mobile or cellular telephone stand (not shown in the figure) fixed to the dashboard 48 in front of the driver's seat. The microphone 12 is best placed somewhere near the instrument panel 50 or above the dashboard 48 or the sun visor in front of the driver's seat. A piece of wire 24 can be used to connect the microphone 12 and the mobile or cellular telephone 44. This arrangement makes it easier for the microphone 12 to pick up voice signals from the driver 40. The transmitter 16 is best placed somewhere near the instrument panel 50 or the sun visor (not shown in FIG. 2) for ease of interception by the receiver earphone 18. A wire 56 can be used to connect the transmitter 16 and the mobile or cellular telephone 44. Batteries or the batteries of the mobile or cellular telephone 44 can be used to power the emitter 16. Alternatively, power can be drawn from the car battery by connection to a cigarette lighter 54 through a power cord 52.

When the mobile or cellular telephone 44 has an incoming call, voice of the [] person on the other end is converted into wireless signals such as infrared or radio waves and then delivered to the receiver earphone 18 by the transmitter 16.

The driver 40, who is wearing the receiver earphone 18, can listen to the voice of the other party without the need to grab the handset of the telephone. The receiver earphone 18 includes a receiver (not shown) for picking up the wireless signals. The receiver can be directly hidden inside the receiver earphone 18, or alternatively, placed inside user's pocket, attached to user's collar or user's clothes in front of the chest. Furthermore, the earphone 18 can be a headset worn on user's head or simply an earplug that can plug into the user's ear. Of course, by means of the microphone 12, the other party can receive voice signals from the driver 40 as well. In general, the microphone 12 can be installed anywhere inside the car. However, because drivers 40 will usually put the mobile or cellular telephone near them, the microphone 12 is preferably placed near the driver 40 as well. Furthermore, since noise interference is low in inside the car 42, the microphone can be connected to the mobile or cellular telephone 44 using a piece of wire to obtain high-quality voice signal transmission. By transmitting mono wireless signals to the receiver earphone 18, hands-free telephone communication is possible. Hence, the telephone communication system of this invention is able to improve driving safety, maintain hearing privacy and lower equipment cost at the same time.

Figure 3:
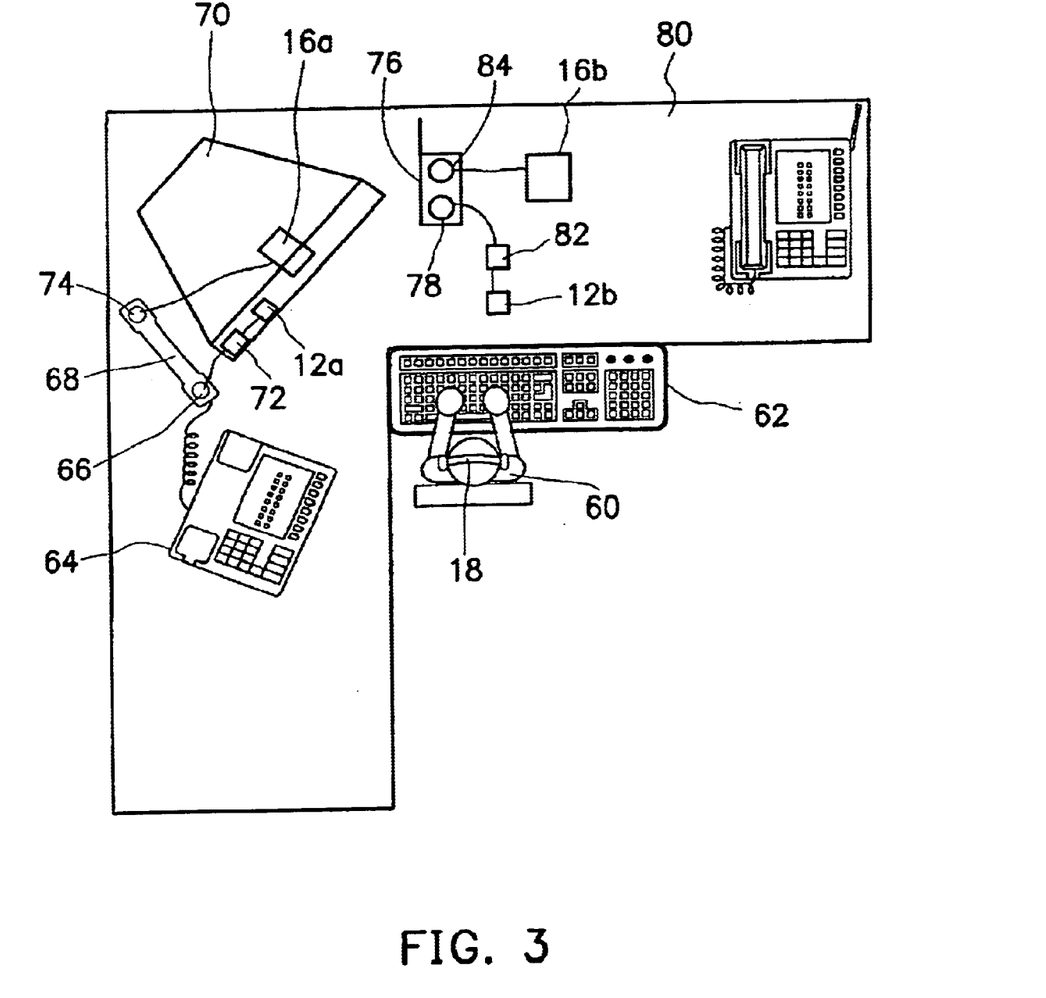
FIG. 3 is a diagram showing the components of a telephone communication system set up inside an office according to this invention.

FIG. 3 is a diagram showing the components of a telephone communication system set up inside an office according to this invention. As shown in FIG. 3, when the user 60 is engaged in computer-related work (for example, using the keyboard 62), his or her hands are not free to hold the handset of a telephone. If there is an indoor wired telephone 64, the microphone 12a of this invention can be connected to the mouthpiece of a handset 68 through a connector 66. The microphone 12a can be positioned at a convenient location, for example, above the monitor screen 70 of the computer, edge of the desk or simply the top of the desk. In order to amplify the voice of the user 60, an amplifier 72 may be added to the connector 66. The infrared transmitter 16a can be connected to the earpiece of the handset 68 through a second connector 74. The infrared transmitter 16a can be similarly positioned above the monitor screen 70. Similarly, if there is an indoor wireless telephone 76, the microphone 12b of this invention can be connected to the mouthpiece of a handset 76 through a third connector 78. The microphone 12a can be positioned at a convenient location, for example, above an office table 80. In order to improve the voice quality, an amplifier 82 may be added to the connector 78 for amplifying the voice of the user 60. The infrared transmitter 16b can he connected to the earpiece of the handset 76 through a fourth connector 84. The infrared transmitter 16b can be similarly positioned on a computer desk 80. The connectors 66, 74, 78 and 84 can be the device as disclosed in Taiwan Patent No. 090814 (or U.S. Pat. No. 5,850,439). Alternatively, any telephone converter or conjunction box available in the market can also be used for voice connection.

When the user 60 hears an incoming telephone call, the user 60 can pick up the telephone call and listens to the voice from the other party through the receiver earphone 18. At the same time, voice from the user 60 can be delivered to the telephone through microphone 12a or 12b. Hence, there is no need to hold the handset with a hand. Furthermore, since no wires are connected to the headset, users 60 will not be tangled by telephone wires. In other words, the user 60 is able to work with both hands while attending to an incoming telephone call. Similarly, the receiver earphone 18 has a receiver (not shown) for receiving wireless signals. The receiver can be directly hidden inside the receiver earphone 18, or alternatively, placed inside user's pocket, attached to user's collar or user's clothes in front of the chest. Furthermore, the earphone 18 can be a headset worn on user's head or simply an earplug that can plug into the user's ear. By means of the microphone 12a or 12b, the other party can receive voice signals from the user 60. In general, the telephone 64 and the handset 74 will be place somewhere near the user 60. Since there will probably be very little noise interference indoor, high-quality sound can still be obtained by passing the voice signal through the microphone 12a or 12b to the telephone 64 or the handset 76 via a piece of wire. By transmitting mono wireless signals to the receiver earphone 18, hands-free telephone communication is possible. Hence, the telephone communication system of this invention is able to provide hands-free telephone communication and maintain hearing privacy at the same time with just minor increase in the cost of equipment.

In addition, the receiver can include an automatic shut-off circuit (label 31 in FIG. 1). When the receiver does not pick up any signal for a pre-determined period, power to the receiver will automatically be cut so that power consumption is minimized.

In summary, the technique of hands-free telephone communication system is at present a trend in telephone application. Besides caring for the driver's safety on the road, the telephone-using consumer public also requires the system to be convenient in use, enough privacy and low cost. In order to cater for all these requirements, a number of considerations regarding the design of the system must be made. Conventionally, the audio system within the car is utilized by the car telephone. Alternatively, some other external speaker systems are connected for broadcasting telephone conversation. Although these conventional systems allow hands-free conversation, privacy cannot be achieved. Furthermore, although most mobile or cellular telephone has external socket for plugging to an external earphone/microphone system so that privacy is achieved, the wiring connection can endanger driving or tangle up common users. If one is not careful, the earphone/microphone system might cause great discomfort to the ear. In some cases, the headset might even be torn away. In addition, even if conventional wireless earphone and microphone are used to boost operational convenience and privacy, equipment cost will increase considerably. For example, a set of stereo wireless device, due to its intrinsic complexity, no matter if infrared or radio wave is used as a medium, the cost is almost equal to and sometimes higher than the price of a mobile or cellular telephone. Therefore, consumers are unlikely accept the product.

The inventor, recognizing such problems, provides a solution from a fresh new consideration. The inventor observes that most people that require hands-free telephone conversation are drivers or some office peoples (for example, receptionists or salespeople). Their commonality lies in that both hands must be free either to drive a car or to take down notes and important information. Moreover, they are most likely to sit in a fixed location not far away from the telephone. In addition, their conversation needs some degree of privacy because some information they gathered may be confidential such as price quotation or other personal information. Based on these observations, the concept of having a telephone communication system that uses a wireless earphone and wired microphone is established. The new telephone communication system is able not only to provide the convenience and privacy of a hands-free telephone, cost of equipment is low as well.

In other words, the telephone communication system of this invention is not only convenient to use, but privacy is also maintained. Moreover, cost of equipment is kept to a minimum. To provide operational convenience, a wireless earphone and a fixed microphone is used. Therefore, a user can enjoy the comfort of hands-free conversation while moving about at the same time. Because the speaker is attached to the earphone, privacy of talks by the other party can be maintained. Furthermore, the combination of a wireless earphone and a wired microphone takes into consideration cost of the equipment. Since the user is unlikely to be far away from the telephone, high-quality sound can still be obtained even when a wired microphone is used. By using mono transmission for the transmitter and the receiver, circuit complexity is greatly reduced. Therefore, the telephone communication system in this invention has the advantages of being able to provide user convenience, privacy and low cost.

It be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A communication system for a mobile or a cellular telephone to be installed inside a car, comprising:
   a microphone connected by a wire to the mobile or cellular telephone for receiving a first voice signal from a user and then transmitting the first voice signal to the mobile or cellular telephone;
   a transmitter connected to the mobile or cellular telephone for receiving, a second voice signal from the telephone and then converting the second voice signal into a wireless signal so that the wireless signal is broadcast by the transmitter, wherein the transmitter can be an separated unit or a built-in unit in the mobile or cellular telephone; and
   a receiver earphone for picking up the wireless signal from the transmitter and then converting the wireless signal into a third voice signal for hearing by the user, wherein the transmitter and the receiver earphone are coupled in a wireless manner, and the receiver earphone forms a stand-alone unit that is not connected to the microphone.

2. The telephone communication system of claim 1, wherein the microphone is erected near an instrument panel of the car in front of the driver's seat.

3. The telephone communication system of claim 1, wherein the transmitter is erected near an instrument panel of the car in front of the driver's seat.

4. The telephone communication system of claim 1, wherein the transmitter is powered by a battery.

5. The telephone communication system of claim 1, wherein the transmitter is powered by a battery of the mobile or the cellular telephone.

6. The telephone communication system of claim 1, wherein the transmitter is powered by a car battery.

7. The telephone communication system of claim 6, wherein the transmitter further includes a power cable connecting the transmitter to the cigarette lighter of the car.

8. The telephone communication system of claim 1, wherein the receiver earphone is composed of a receiver and an earphone connected to the receiver.

9. The telephone communication system of claim 8, wherein the receiver further includes an automatic shut-off circuit.

10. The telephone communication system of claim 1, wherein the wireless signal includes infrared wave.

11. The telephone communication system of claim 1, wherein the wireless signal includes radio wave.

12. The telephone communication system of claim 1, wherein the mobile or the cellular telephone further includes an automatic answer circuit.

13. An indoor communication system for telephone to be used together with an indoor wire-connected telephone, comprising:
    a microphone connected by a wire to the indoor wire-connected telephone for receiving a first voice signal from a user and then transmitting the first voice signal to the indoor wire-connected telephone;
    a transmitter connected to the indoor wire-connected telephone for receiving a second voice signal from the indoor wire-connected telephone and then converting the second voice signal into a wireless signal so that the wireless signal is broadcast by the transmitter, wherein the transmitter can be an separated unit or a built-in unit in the indoor wire-connected telephone; and
    a receiver earphone for picking up the wireless signal from the transmitter and then converting the wireless signal into a third voice signal for hearing by the user, wherein the transmitter and the receiver earphone are coupled in a wireless manner, and the receiver earphone forms a stand-alone unit that does not contain a transmitter.

14. The telephone communication system of claim 13, wherein the receiver earphone is composed of a receiver and an earphone connected to the receiver.

15. The telephone communication system of claim 14, wherein the receiver further includes an automatic shut-off circuit.

16. The telephone communication system of claim 13, wherein the microphone is connected to the indoor wire-connected telephone through a connector.

17. The telephone communication system of claim 16, wherein the connector further includes an amplifier for amplifying the first voice signals.

18. The telephone communication system of claim 13, wherein the transmitter is connected to the indoor wire-connected telephone through a connector.

19. The telephone communication system of claim 13, wherein the wireless signal includes infrared wave.

20. The telephone communication system of claim 13, wherein the wireless signal includes radio wave.

21. The telephone communication system of claim 13, wherein the in-door wire-connected telephone further includes an automatic answer circuit.

22. An indoor communication system for telephone to be used together with an indoor wireless telephone, comprising:
    a microphone connected by a wire to the indoor wireless telephone for receiving a first voice signal from a user and then transmitting the first voice signal to the indoor wireless telephone;
    a transmitter connected to the indoor wireless telephone for receiving a second voice signal from the indoor wireless telephone and then converting the second voice signal into a wireless signal so that the wireless signal is broadcast by the transmitter, wherein the transmitter can be an separated unit or a built-in unit in the indoor wireless telephone; and
    a receiver earphone for picking up the wireless signal from the transmitter and then converting the wireless signal into a third voice signal for hearing by the user, wherein the transmitter and the receiver earphone are coupled in a wireless manner, and the receiver earphone forms a stand-alone unit that does not contain a transmitter.

23. The telephone communication system of claim 22, wherein the receiver earphone is comprised of a receiver and an earphone connected to the receiver.

24. The telephone communication system of claim 23, wherein the receiver further includes an automatic shut-off circuit.

25. The telephone communication system of claim 22, wherein the microphone is connected to the indoor wireless telephone through a connector.

26. The telephone communication system of claim 25, wherein the connector further includes an amplifier for amplifying the first voice signal.

27. The telephone communication system of claim 22, wherein the transmitter is connected to the indoor wireless telephone through a connector.

28. The telephone communication system of claim 22, wherein the wireless signal includes infrared wave.

29. The telephone communication system of claim 22, wherein the wireless signal includes radio wave.

30. A communication system, comprising:
a telephone having a built-in transmitter, wherein the built-in transmitter is used for receiving a first voice signal from the telephone and then converting the first voice signal into a wireless signal so that the wireless signal is broadcast by the built-in transmitter;
a microphone connected by a wire to the telephone for receiving a second voice signal from a user and then transmitting the second voice signal to the telephone; and
a receiver earphone for picking up the wireless signal from the built-in transmitter of the telephone and then converting the wireless signal into a third voice signal for hearing by the user, wherein the receiver earphone forms a stand-alone unit that is not connected to the microphone; and
a wire earphone set, which is optionally comprised in the system to connect to the telephone, wherein when the ire earphone is comprised to be connected to the telephone, the built-in transmitter is automatically disabled.

31. The communication system of claim 30, wherein the telephone is selected form the group consisting of the wired telephone, the wireless telephone, the mobile telephone and the cellular telephone.

32. The communication system of claim 30, wherein the receiver earphone is composed of a receiver and an earphone connected to the receiver.

33. The communication system of claim 32, wherein the receiver farther includes an automatic shut-off circuit.

34. The communication system of claim 30, wherein the telephone further includes an automatic answer circuit.

35. The communication system of claim 30, wherein the wireless signal includes infrared wave.

36. The communication system of claim 30, wherein the wireless signal includes radio wave.

37. A communication system for a telephone to be installed inside a car, comprising:
a microphone connected by a wire to the telephone for receiving a first voice signal from a user and then transmitting the first voice signal to the mobile or cellular telephone;
a transmitter connected to the telephone for receiving a second voice signal from the telephone and then converting the second voice signal into a wireless signal so that the wireless signal is broadcast by the transmitter; and
a receiver earphone for picking up the wireless signal from the transmitter and then converting the wireless signal into a third voice signal for hearing by the user, wherein the transmitter and the receiver earphone are coupled in a wireless manner, and the receiver earphone forms a stand-alone unit that is not connected to the microphone.

38. The communication system of claim 37, wherein the telephone comprises a mobile or cellular telephone installed in the car.

39. The communication system of claim 37, wherein the transmitter is built in the telephone.

* * * * *